US008428831B2

(12) United States Patent
Thompson et al.

(10) Patent No.: US 8,428,831 B2
(45) Date of Patent: Apr. 23, 2013

(54) AUTOMATIC STEERING SYSTEM FOR AN AGRICULTURAL IMPLEMENT

(75) Inventors: Dennis Thompson, Saskatoon (CA); Terry Friggstad, Saskatoon (CA)

(73) Assignee: CNH Canada, Ltd. (CA)

( * ) Notice: Subject to any disclaimer, the term of this patent is extended or adjusted under 35 U.S.C. 154(b) by 690 days.

(21) Appl. No.: 12/328,378

(22) Filed: Dec. 4, 2008

(65) Prior Publication Data
US 2009/0272551 A1    Nov. 5, 2009

Related U.S. Application Data (63) Continuation-in-part of application No. 12/113,674, filed on May 1, 2008, now Pat. No. 7,849,932.

(51) Int. Cl.
*G06G 7/76*      (2006.01)
(52) U.S. Cl.
USPC .............................. 701/50; 172/3; 172/280
(58) Field of Classification Search ............ 172/2, 3, 172/5, 10, 278, 280, 286, 291; 701/50
See application file for complete search history.

(56) References Cited

U.S. PATENT DOCUMENTS

| | | | |
|---|---|---|---|
| 2,780,158 A | 2/1957 | Pursche | |
| 2,982,363 A | 5/1961 | Sweet et al. | |
| 3,288,480 A | 11/1966 | Calkins et al. | |
| 4,098,346 A | 7/1978 | Stanfill et al. | |
| 4,282,935 A | 8/1981 | Dietrich | |
| 4,359,105 A | 11/1982 | Van Natta | |
| 4,944,355 A | 7/1990 | Karchewski | |
| 5,154,240 A | 10/1992 | Carrick | |
| 5,255,756 A * | 10/1993 | Follmer et al. | 180/401 |
| 5,666,792 A * | 9/1997 | Mullins | 56/10.2 A |
| 5,715,665 A * | 2/1998 | Diekhans et al. | 56/10.2 F |
| 5,828,971 A * | 10/1998 | Diekhans et al. | 701/41 |
| 6,044,316 A * | 3/2000 | Mullins | 701/50 |
| 6,179,315 B1 | 1/2001 | Boriack | |
| 6,377,881 B1 * | 4/2002 | Mullins | 701/50 |
| 6,553,299 B1 | 4/2003 | Keller et al. | |
| 6,553,925 B1 * | 4/2003 | Beaujot | 111/14 |

(Continued)

FOREIGN PATENT DOCUMENTS

FR      2751165      7/1997

OTHER PUBLICATIONS

Orthman Agricultural, Tracker IV Implement Guidance System Web Page, http://www.orthman.com/html603/tracker-IV.html, accessed Nov. 26, 2008.

(Continued)

*Primary Examiner* — Jamie L McGowan
(74) *Attorney, Agent, or Firm* — Rebecca Henkel (57) ABSTRACT

An assembly for facilitating steering of an agricultural implement linkable to a work vehicle is disclosed. The assembly comprises at least a first ground-engaging wheel to engage a ground surface below a frame of the agricultural implement to support the frame above the ground surface. The assembly further comprises a positioning system for receiving a positioning signal from a positioning source. The positioning system determines a current position of the agricultural implement from at least the positioning signal, and the positioning system generates a control signal derived from the current position of the agricultural implement. The assembly further comprises a steering cylinder connected to the first ground-engaging wheel. The steering cylinder operatively connects to the positioning system to steer the first ground-engaging wheel based on the control signal.

9 Claims, 9 Drawing Sheets

U.S. PATENT DOCUMENTS

| | | | | |
|---|---|---|---|---|
| 7,036,604 B2* | 5/2006 | Steinlage et al. | ............ | 172/452 |
| 7,147,241 B2 | 12/2006 | Beaujot et al. | | |
| 7,849,932 B2* | 12/2010 | Friggstad et al. | ............ | 172/278 |
| 7,971,886 B2* | 7/2011 | Neudorf et al. | ............ | 280/87.2 |
| 2006/0178820 A1* | 8/2006 | Eglington et al. | ............ | 701/209 |
| 2008/0177449 A1* | 7/2008 | Pickett et al. | ................ | 701/50 |
| 2010/0017075 A1* | 1/2010 | Beaujot | ........................ | 701/50 |

OTHER PUBLICATIONS

Bill Strautman, "Rear Steer Keeps Seed Hawk on Steep Hills", Western Producer Newspaper, Apr. 1, 2004, p. 103, Saskatoon, CA.

Options—Rear Wheel Steering, Seed Hawk Product Literature.

* cited by examiner

AUTOMATIC STEERING SYSTEM FOR AN AGRICULTURAL IMPLEMENT

CROSS-REFERENCE TO RELATED APPLICATIONS

This application is a continuation-in-part of U.S. patent application Ser. No. 12/113,674, filed on May 1, 2008 now U.S. Pat. No. 7,849,932, which is hereby incorporated by reference as if fully set forth herein.

STATEMENT REGARDING FEDERALLY SPONSORED RESEARCH OR DEVELOPMENT

Not applicable.

BACKGROUND OF THE INVENTION

The present invention relates to lift and steering mechanisms for agricultural implements and more specifically to an assembly that can automatically adjust the height of an implement main frame and to steer implement wheels.

Large agricultural planters typically include a central frame assembly that is supported by a plurality of ground engaging wheels, one or more long tool supporting booms or wing frame assemblies mounted to the central frame assembly and extending laterally there from to, as the label implies, support planter row units, and a hitch that extends in a forward direction from the frame to link the planter to a tractor or the like for transport. A typical row unit includes a disc or other ground engaging component for opening a seed trench of a certain depth in the ground as the planter is pulled through a field, a seed dispensing subassembly for dispersing seeds in a controlled fashion into the trench and, in many cases, other components for adjusting trench depth, seed dispersal rate, etc. Here, in some cases, the total length of the main frame and wing assemblies can be ninety feet or more so that wide swaths of a field can be planted during each pass there through.

While wide planters reduce the amount of time required to plant a field, planters with large widths make it difficult if not impossible to transport the planters to and from fields to be planted. For this reason wide planters have been designed that are typically reconfigurable to facilitate transport. For instance, in many cases wide planters have been designed with extendable hitches and with the long wing frame assemblies mounted to the central frame assembly to fold forward over a portion of the extended hitch prior to transport. In these cases the ground engaging wheels on the central frame assembly continue to support the central frame and folded wing frames for transport.

While row unit trenching discs and other row unit components have to contact or be very near ground surface level during a seeding activity, during transport row units have to be raised so that they clear ground surface level. To this end many planters have been designed that include systems for adjusting the height of wing frame assemblies above ground level so that row units can be positioned at various planting heights or a relatively high transport height.

In the case of folding wing planters where a hitch extends forward and wing assemblies fold forward over the hitch for transport, while planter width may be suitable for transport, the planter length is increased appreciably, which can exacerbate the process of maneuvering the planter through turns. In this regard, when a planter hitch is extended and wing assemblies are folded into the transport position, the ground engaging wheels on the central frame assembly are far away from the end of the hitch linked to a tractor, which means that the tractor/planter assembly has an extremely large turning radius in this configuration. A large turning radius can be particularly problematic when turning off a narrow road and through a narrow pass into a field or when maneuvering through other tight spots.

Further still, large agricultural planters are typically towed by tractors that are manually controlled or steered by an operator. Planting operations for large fields may require an extensive amount of time to complete, such as several hours, and in the case of manually controlled vehicles, the operator must constantly steer the vehicle to ensure proper planting coverage. Improper planting coverage may result in lost revenues for the operator or, if additional passes are used to address unplanted areas, higher fuel costs. As a result, operators typically invest a large amount of effort to ensure all areas of a field are properly covered without requiring additional passes. However, the effort required to constantly steer a manually controlled tractor for a long period of time can easily fatigue an operator.

To address the drawbacks of manually controlled tractors, several automatically controlled tractors are presently available. Automatically controlled tractors typically include global positioning system (GPS) receivers as well as other components to automatically control the path of the tractor and the trailing planter. However, the effectiveness of automatically controlled tractors is limited because the path of the planter is indirectly controlled by the tractor. As a result, the planter may not provide proper planting coverage in some situations. For example, automatically controlled tractors may not provide proper planting coverage in strip-till operations. Strip-till operations generally involve use of a tilling implement to first provide tilled rows in a field and a planting implement to subsequently plant seeds in the field. The planting units must be appropriately positioned relative to the rows formed by the tilling implement. However, the planting units may not be appropriately positioned relative to the rows even if the tractor follows the same path for tilling and planting due to, for example, an uneven field surface.

Considering at least the above limitations of prior designs, a system is needed for directly controlling the path of an agricultural implement.

BRIEF SUMMARY OF THE INVENTION

In some embodiments, the present invention provides an assembly for facilitating steering of an agricultural implement linkable to a work vehicle. The agricultural implement includes a main frame and a connection joint for linking the main frame to the work vehicle. The assembly comprises at least a first ground-engaging wheel to engage a ground surface below the frame to support the frame above the ground surface. The assembly further comprises a positioning system for receiving a positioning signal from a positioning source. The positioning system determines a current position of the agricultural implement from at least the positioning signal, and the positioning system generates a control signal derived from the current position of the agricultural implement. The assembly further comprises a steering cylinder connected to the first ground-engaging wheel. The steering cylinder operatively connects to the positioning system to steer the first ground-engaging wheel based on the control signal.

In some embodiments, the positioning system comprises an implement receiver for receiving the positioning signal from the positioning source, and the implement receiver sends a receiver signal derived from the current position of the agricultural implement. The positioning system further comprises a controller operatively connected to the implement receiver for receiving the receiver signal, and the controller sends the control signal.

In some embodiments, the controller operatively connects to a vehicle receiver of the work vehicle. The vehicle receiver receives the positioning signal from the positioning source, and a current position of the work vehicle is determined from the positioning signal. The controller receives a vehicle receiver signal from the vehicle receiver, and the vehicle receiver signal is derived from the current position of the work vehicle.

In some embodiments, the steering cylinder is a hydraulic steering cylinder that includes a hydraulic valve operatively connected to the positioning system. The hydraulic valve controls an amount of hydraulic fluid supplied to the hydraulic steering cylinder in response to the control signal.

In some embodiments, the present invention provides an assembly for facilitating steering of an agricultural implement towed by a work vehicle. The agricultural implement includes a main frame and a connection joint for linking the main frame to the work vehicle. The assembly comprises a wheel support member supported below the frame and at least a first ground-engaging wheel supported by the wheel support member to engage a ground surface below the frame to support the frame above the ground surface. The assembly further comprises at least a first lift cylinder connected between the frame and the wheel support member. The first lift cylinder is controllable to adjust the height of the frame above the ground. The assembly further comprises an implement receiver for receiving a positioning signal from a positioning source. The implement receiver determines a current position of the implement receiver from at least the positioning signal. The implement receiver sends a receiver signal derived from the current position of the implement receiver. The assembly further comprises a controller operatively connected to the implement receiver for receiving the receiver signal. The controller generates a control signal derived from the receiver signal. The assembly further comprises a steering cylinder connected to the wheel support member. The steering cylinder operatively connects to the controller to steer the first ground-engaging wheel based on the control signal.

In some embodiments, the first lift cylinder is operatively connected to the controller to adjust the height of the frame above the ground in response to the control signal.

In some embodiments, the assembly further comprises a second lift cylinder connected between the frame and the wheel support member on a side of the frame opposite the first lift cylinder. The second lift cylinder is controllable to adjust the height of the frame above the ground.

In some embodiments, the assembly further comprises at least a second ground-engaging wheel supported by the wheel support member and engaging the ground surface below the frame to support the frame above the ground surface. The steering cylinder is connected to the second-ground engaging wheel to control steering of the second ground-engaging wheel based on the control signal and independently of the first lift cylinder.

In some embodiments, the steering cylinder and the first lift cylinder are hydraulic cylinders, and each of the steering cylinder and the first lift cylinder include a hydraulic valve operatively connected to the controller to control an amount of hydraulic fluid supplied to the hydraulic cylinder based on the control signal.

In some embodiments, the present invention provides a method of steering an agricultural implement, comprising the steps of: receiving a positioning signal from a positioning source as the agricultural implement is motivated by a work vehicle; determining a current position of an implement receiver located on the agricultural implement from the positioning signal; and controlling actuation of a steering cylinder connected to at least a first ground-engaging wheel based on the current position of the implement receiver to steer the first ground-engaging wheel.

In some embodiments, the steering cylinder is a hydraulic cylinder including a hydraulic valve, and the hydraulic valve supplies a hydraulic fluid to the steering cylinder to control actuation of the steering cylinder based on the current position of the implement receiver.

In some embodiments, the positioning signal is a global positioning system signal.

In some embodiments, the method of steering the agricultural implement further comprises the step of determining and storing a previous coverage area from dimensions of the agricultural implement and a previous path of the agricultural implement.

In some embodiments, the method of steering the agricultural implement further comprises the step of determining a potential implement travel path from potential incremental orientation changes of the first ground-engaging wheel.

In some embodiments, the method of steering the agricultural implement further comprises the step of determining a potential coverage area from the potential incremental orientation changes of the first ground-engaging wheel.

In some embodiments, the method of steering the agricultural implement further comprises the steps of determining and storing a previous coverage area from dimensions of the agricultural implement and the receiver signal; and determining if a current implement travel path and the previous coverage area will create a non-covered area.

In some embodiments, the method of steering the agricultural implement further comprises the step of reorienting the first ground-engaging wheel to substantially minimize the creation of the non-covered area.

In some embodiments, the method of steering the agricultural implement further comprises the step of steering the first-ground engaging wheel to prevent the agricultural implement from moving from an implement straight travel path orientation when traveling on a hill.

In some embodiments, the method of steering the agricultural implement further comprises the step of reorienting the agricultural implement relative to an implement straight travel path orientation to perform a planting operation subsequent to a strip-till operation.

In some embodiments, the method of steering the agricultural implement further comprises the step of steering the first ground-engaging wheel to appropriately position planting units of the agricultural implement relative to rows formed during the strip-till operation.

These and other aspects of the invention will become apparent from the following description. In the description, reference is made to the accompanying drawings that form a part hereof, and in which there is shown a preferred embodiment of the invention. Such embodiment does not represent the full scope of the invention and reference is made therefore to the claims herein for interpreting the scope of the invention.

DETAILED DESCRIPTION OF THE INVENTION

Figure 1:
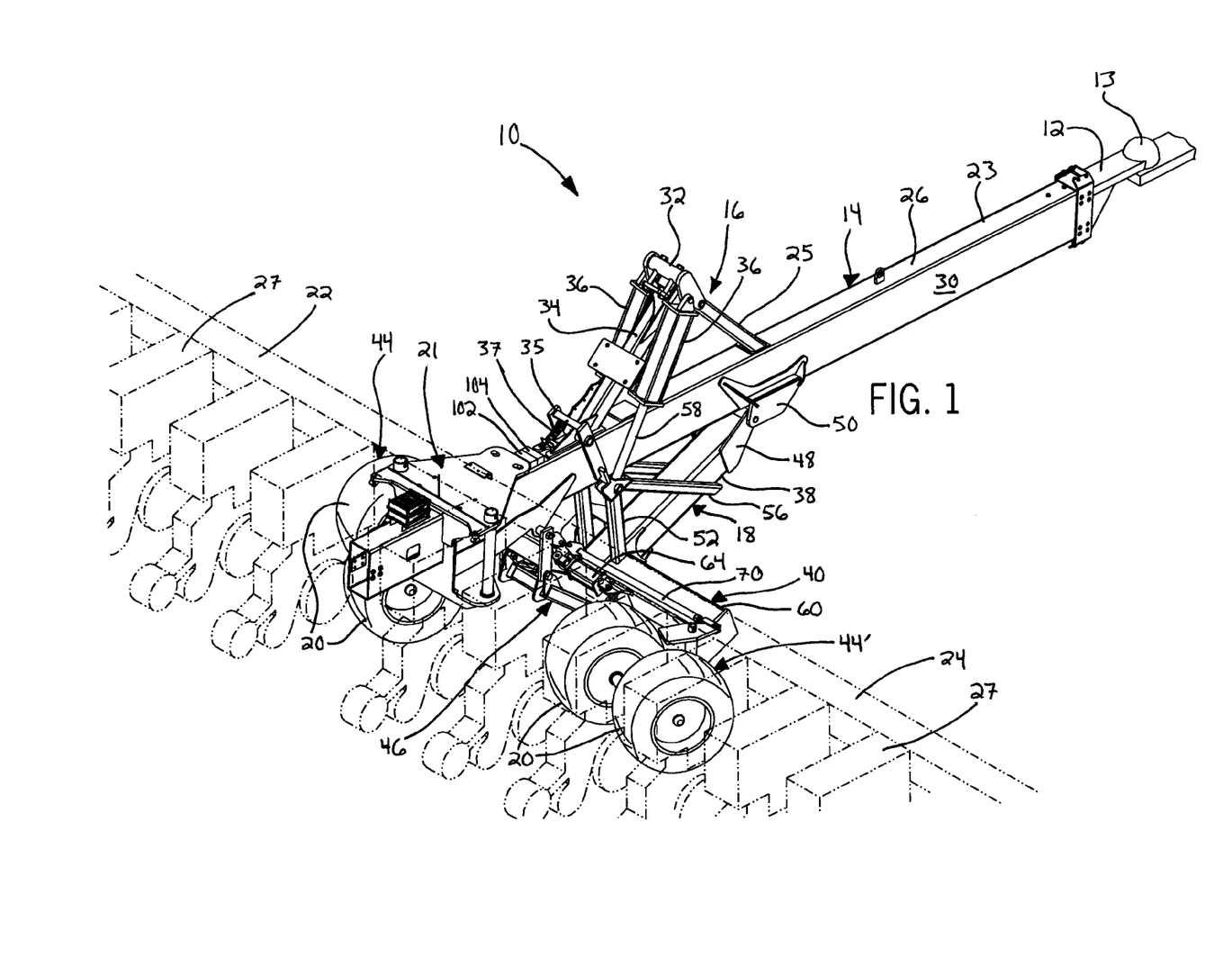
FIG. 1 is a perspective view of a agricultural implement including planter row units shown in a working position that is consistent with at least some aspects of the present invention.

Referring now to the drawings wherein like reference numerals correspond to similar elements throughout the several views, and more specifically referring to FIGS. 1-12, an embodiment of the invention will be described in the context of a work vehicle 96 (FIG. 9), such as a tractor, which is linked to an agricultural implement 10 by an extendable hitch 12 and a connection joint 13. In this description, the word 'linked' should be understood as a connection between components in which the components can rotate relative to one another. In addition to the extendable hitch 12, the agricultural implement 10 includes a frame 14, a lift cylinder anchor member 16 that connects to and supports hydraulic cylinders 36, a wheel support member 18 that connects to wheel pivot assemblies 44 and 44', a boom support member 21 that supports foldable wing booms 22 and 24, and a positioning system 100 that steers the wheel pivot assemblies 44 and 44'. Referring to FIG. 1, the foldable wing booms 22 and 24 are shown in dashed lines and may include various types of tools that are well known in the art. For example, the foldable wing booms 22 and 24 may include seed planting units 27. The foldable wing booms 22 and 24 each link to the boom support member 21 to rotate about generally vertical axes to fold forward near the frame 14. The extendable hitch 12 is provided to increase the distance between the work vehicle and the locations at which the wing booms 22 and 24 pivot so that, when folded forward, the booms can be accommodated between the pivot locations and the work vehicle. Thus, when the wing booms 22 and 24 are folded, the booms do not contact the work vehicle 96.

Referring to FIGS. 1-6, the frame 14 includes a hitch boom 23 and a hitch boom bracket 50. The hitch boom 23, in some embodiments, is an elongated hollow member with a generally rectangular cross section. The hitch boom 23 includes an upper surface 26, a lower surface 28, and lateral sides 30. The hitch boom bracket 50 includes generally flat sections that connect to the hitch boom 23, and in some embodiments, more specifically, the lateral sides 30 of the hitch boom 23.

Referring to FIGS. 1-3 and 6, the anchor member 16 is generally positioned above the hitch boom 23 and includes a first support member 25 that connects to a cylinder attachment bracket 32, a second support member 34 opposite the first support member 25, a locking member 35 to lock the frame 14, and a spring 37 to bias the locking member 35. The first support member 25 has a generally rectangular cross section. The first support member 25 extends rearward and above the frame 14 from a first end that connects to the upper surface 26 of the hitch boom 23. The cylinder attachment bracket 32 connects to a distal end of the first support member 25. The second support member 34 is similar in structure to the first support member 25. Unlike the first support member 25, the second support member 34 extends forward and above the frame 14 from an end that connects to the upper surface 26 of the hitch boom 23. A distal end of the second support member 25 connects to the cylinder attachment bracket 32. The locking member 35 is a generally U-shaped member with sections near the upper surface 26 and the lateral sides 30 of the hitch boom 23. The locking member 35 is linked to the end of the second support member 34 proximate the hitch boom 23. The spring 37 biases the locking member 35 towards the configuration shown in FIGS. 3 and 4. The function of the locking member 35 and the spring 37 will be discussed in further detail below.

Referring to FIGS. 3-6, each of the hydraulic cylinders 36 includes an extending rod 58. The hydraulic cylinders 36 may also each include a hydraulic valve to control an amount of fluid that the cylinder receives from a pump (not shown). The hydraulic cylinders 36 are linked to the cylinder attachment bracket 32 and extend rearward and downward therefrom. A single hydraulic cylinder 36 is positioned on each lateral side 30 of the hitch boom 23. The function of the hydraulic cylinders 36 will be discussed in further detail below.

Figure 2:
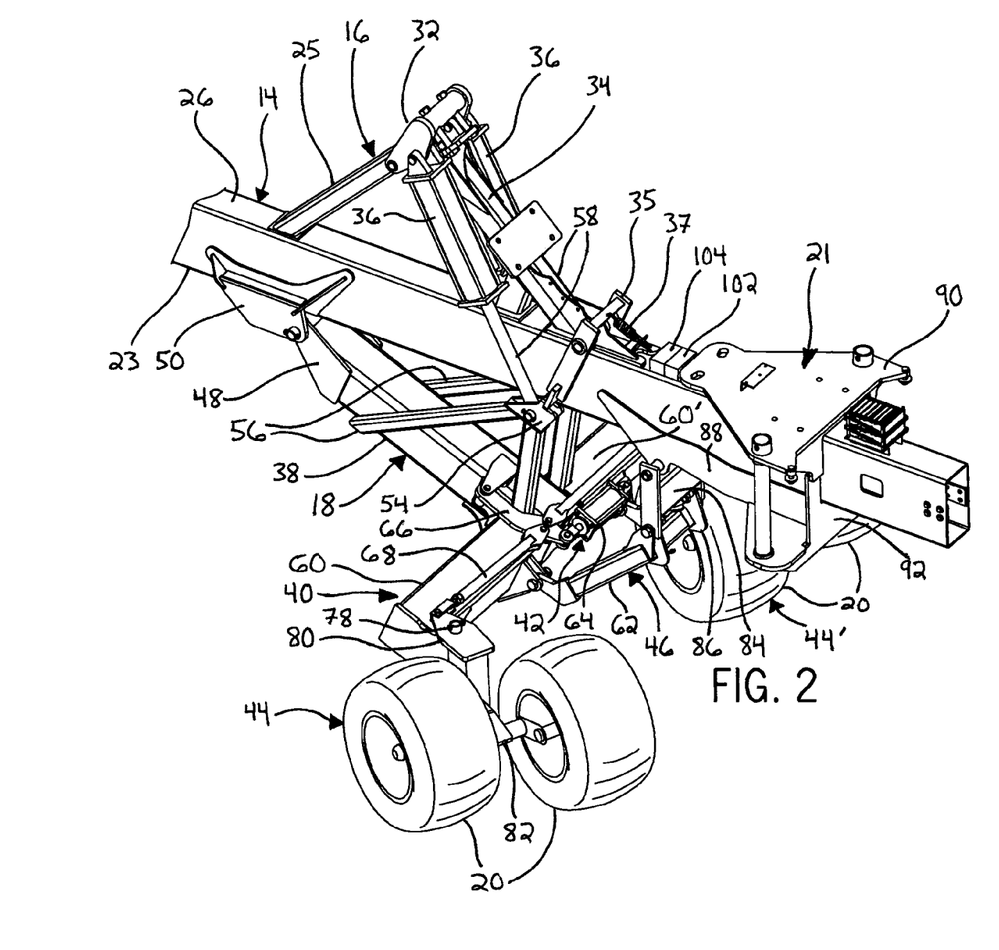
FIG. 2 is a perspective partial view of the agricultural implement of FIG. 1.

Referring to FIGS. 1-8, and as most clearly shown in FIG. 2, the wheel support member 18 is generally positioned below the hitch boom 23 and includes an elongated neck member 38, an elongated shoulder member 40 that connects to the wheel pivot assemblies 44 and 44', a bracket 48 to connect to the frame 14, two distal connection members 52, two cylinder rod brackets 54 and two intermediate connection members 56 to connect to the hydraulic cylinders 36, a bracket 72 to connect to a steering assembly 42, and a linkage assembly 46. In some embodiments, the elongated neck member 38 has a generally rectangular cross section and may be hollow. The elongated neck member 38 extends downward and rearward from a first end proximate the hitch boom 23. The bracket 48 connects to the end of the elongated neck member 38 proximate the hitch boom 23. The bracket 48 is linked to the hitch boom bracket 50 for pivotal movement of the wheel support member 18 about a generally horizontal axis below the hitch boom 23. The bracket 72 connects to the elongated neck member 38 at a position near the distal end of the elongated neck member 38.

Figure 7:
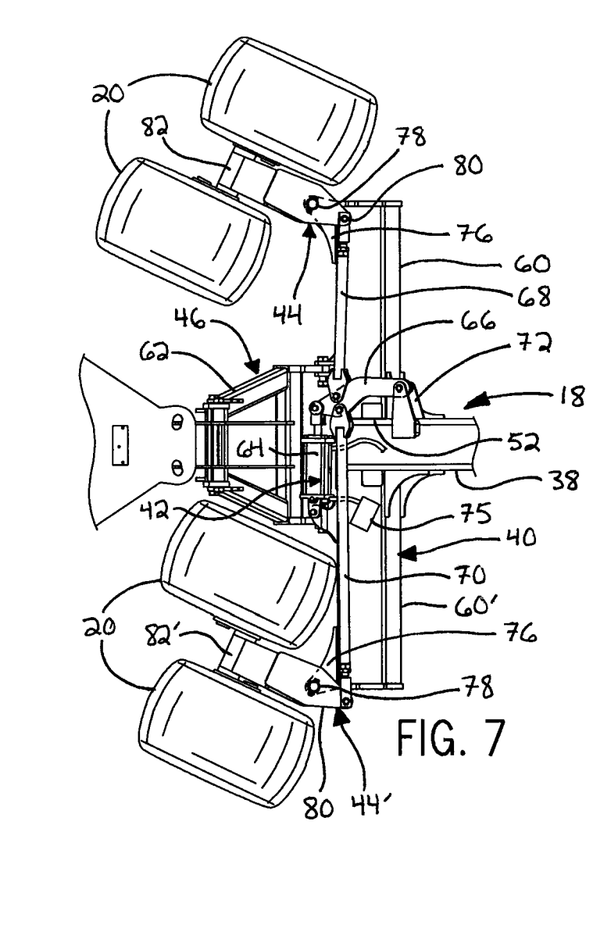
FIG. 7 is a top view of a wheel support member of the agricultural implement with wheel assemblies rotated for a left turn of the implement.
Figure 8:
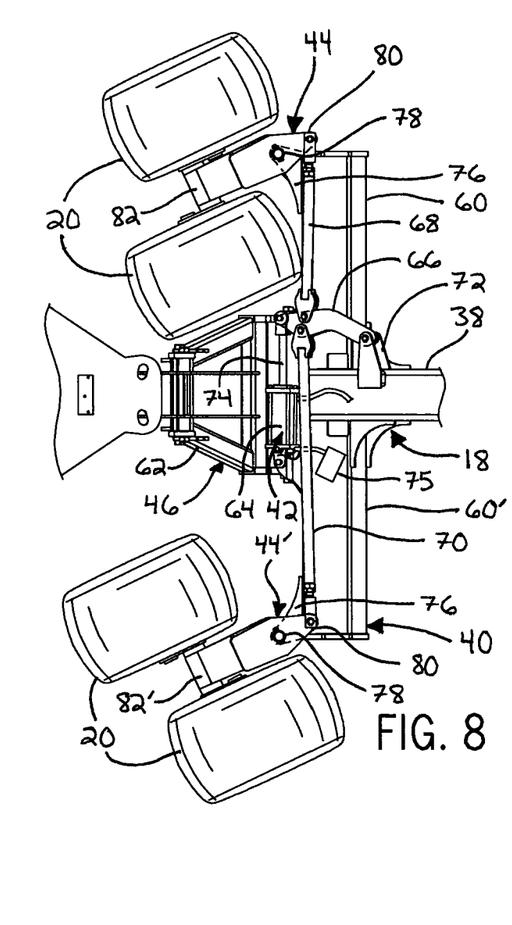
FIG. 8 is a top view of the wheel support member of FIG. 7 with wheel assemblies rotated for a right turn of the implement.

Referring to FIGS. 7 and 8, the elongated shoulder member 40 of the wheel support member 18 includes two arm members 60 and 60' each connecting to a bracket 76 to connect to one of the wheel pivot assemblies 44 and 44'. The arm members 60 and 60' extend in generally opposite directions from a position in which the shoulder member 40 rigidly connects to the distal end of the elongated neck member 38. The arm members 60 and 60' are mirror images of one another, but are otherwise substantially similar components. Therefore, only the arm member 60 will be described here in detail. The arm member 60 may have a generally rectangular cross section and may be hollow. The bracket 76 forms a wheel pivot channel (not shown) and connects to the end of the arm member 60 opposite the distal end of the neck member 38.

Referring to FIG. 2 and as briefly described above, the wheel support member 18 includes, among other components, two distal connection members 52, two cylinder rod brackets 54, and two intermediate connection members 56. The distal connection members 52 are substantially similar components. The same also applies to the cylinder rod brackets 54 and the intermediate connection members 56. Therefore, only components on the left side of the agricultural implement 10 (the visible side as viewed in FIG. 2) will be described here in detail.

The distal connection member 52 may have a generally rectangular cross section and may be hollow. The distal connection member 52 connects to the distal end of the elongated neck member 38 and extends in a generally vertical direction there above. As most clearly shown in FIGS. 4 and 5, the cylinder rod bracket 54 is a generally trapezoidal-shaped bracket. The cylinder rod bracket 54 rigidly connects to the distal connection member 52, is linked to the extending rod 58 of the hydraulic cylinder 36, and can engage the locking member 35. The function of cylinder rod brackets 54 in connection with the locking member 35 will be discussed in further detail below. The intermediate connection member 56 may have a generally rectangular cross section and may be hollow. The intermediate connection member 56 rigidly connects to a center portion of the elongated neck member 38 and extends in a generally rearward and upward direction there above. The intermediate connection member 56 also rigidly connects to the cylinder rod bracket 54.

Referring to FIGS. 7 and 8, the steering assembly 42 of the wheel support member 18 includes a hydraulic steering cylinder 64, an intermediate pivot member 66 connected to the hydraulic steering cylinder 64, and first and second elongated links 68 and 70 to connect to the wheel pivot assemblies 44 and 44'. In some embodiments, the steering assembly 42 may include a second hydraulic steering cylinder (not shown). The hydraulic steering cylinder 64 includes an extendable rod 74 and may include a hydraulic valve 75 to control an amount of fluid that the cylinder receives from the pump. The hydraulic steering cylinder 64 is linked to the rear surface of the arm member 60'. The intermediate pivot member 66 includes first and second ends and a central portion. In some embodiments, the intermediate pivot member 66 is generally flat and is shaped so that the intermediate pivot member 66 does not contact the distal connection member 52, as most clearly shown in FIG. 7. The first end of the intermediate pivot member 66 is linked to the bracket 72 connected to the elongated neck member 38. The second end of the intermediate pivot member 66 is linked to the extendable rod 74 of the hydraulic steering cylinder 64. In some embodiments, the first and second elongated links 68 and 70 are generally identical rod-like members, except the first link 68 is shorter than the second link 70. Therefore, only the first link 68 will be described here in detail. A first end of the first elongated link 68 is linked to the central portion of the intermediate pivot member 66. A second end of the first elongated link 68 extends generally in the direction of the arm member 60.

Referring to FIGS. 2, 7, and 8 and as briefly discussed above, the wheel support member 18 includes, among other components, a linkage assembly 46. The linkage assembly includes a first link 62 connected to the shoulder member 40, a second link 84 connected to the first link 62, and an intermediate member 86 between the first and second links 62 and 84. As most clearly shown in FIGS. 7 and 8, the first link 62 is generally trapezoidal and tapers from an end that links to the arm members 60 and 60' to a distal end. As most clearly shown in FIG. 2, the second link 84 is generally H-shaped and includes two generally flat side sections connected by an intermediate section. A first end of the second link 84 pivotally connects to the distal end of the first link 62, and a second end of the second link 84 generally extends towards the hitch boom 23. The intermediate member 86 is fixed to the second link 84 and engages the first link 62 as shown in FIG. 2. The intermediate member 86 permits part of the weight of the agricultural implement 10 to be supported through the linkage assembly 46.

Referring to FIGS. 7 and 8, the wheel pivot assemblies 44 and 44' are mirror images of one another, but are otherwise substantially similar assemblies. Therefore, only the wheel pivot assembly 44 will be described here in detail. The wheel pivot assembly 44 includes two ground engaging wheels 20, a pin 78 that permits the wheel assembly 44 to pivot, a pivot arm 80 to connect to the steering assembly 42, and a wheel bracket 82 to support the ground engaging wheels 20. The wheel pivot assembly 44 is connected to the wheel support member 18 by the pin 78 that passes through the wheel pivot channel (not shown) of the bracket 76. The pivot arm 80 extends from the pin 78 and defines a surface that is generally perpendicular to the longitudinal axis of the pin 78. A distal end of the pivot arm 80 is linked to the second end of the first elongated link 68. The wheel bracket 82 connects to the pivot arm 80. The wheel bracket 82 also defines an axis of rotation for, and rotatably connects to, the two wheels 20. In at least some embodiments, the two wheels 20 rotatably connect to the wheel bracket 82 are offset from one another in the travel direction of the agricultural implement.

Figures 3, 4:
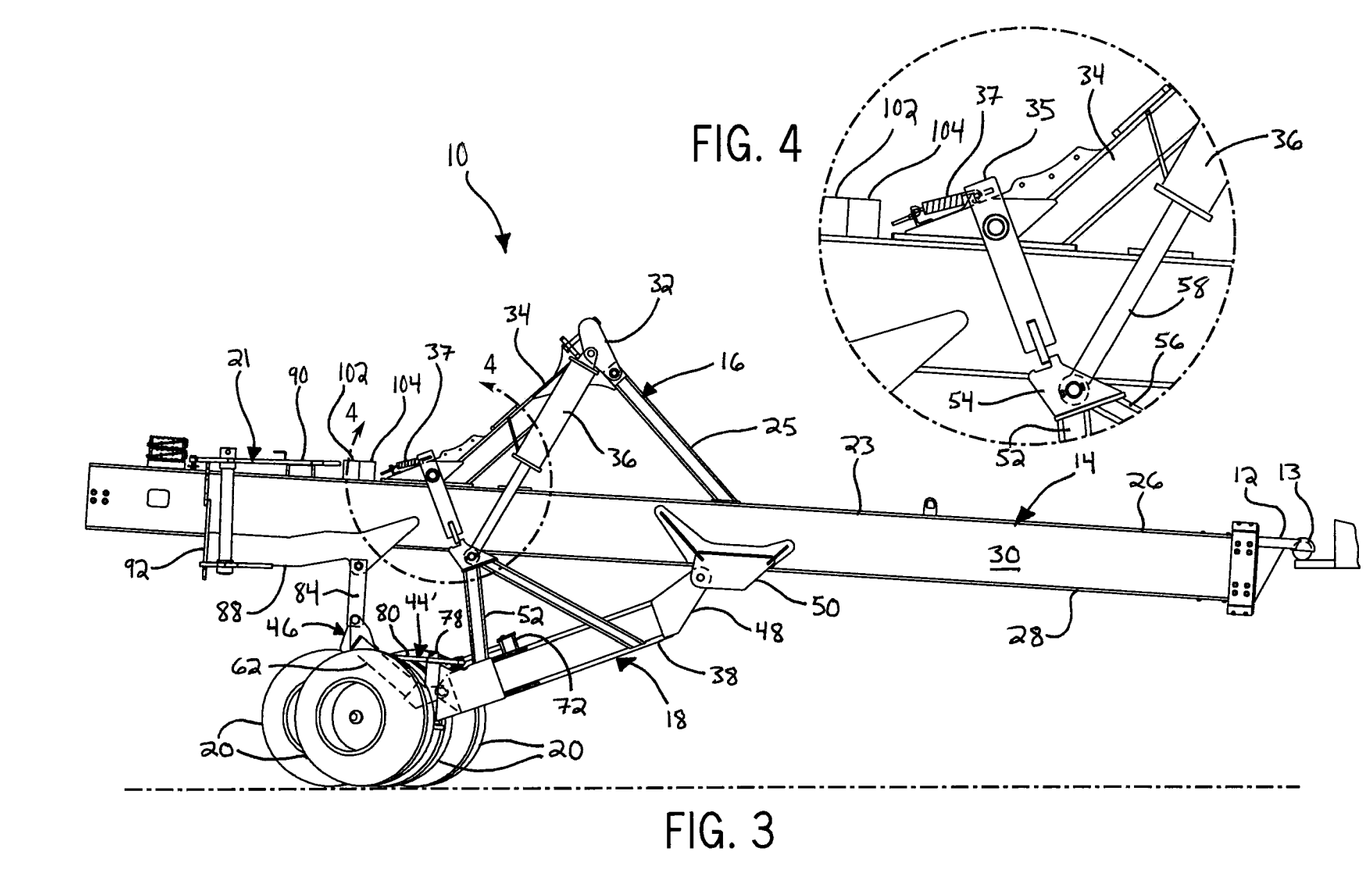
FIG. 3 is a side view of the agricultural implement of FIG. 1 shown in a transporting position.
FIG. 4 is a detail view of the area defined by line 4-4 in FIG. 3.
Figures 5, 6:
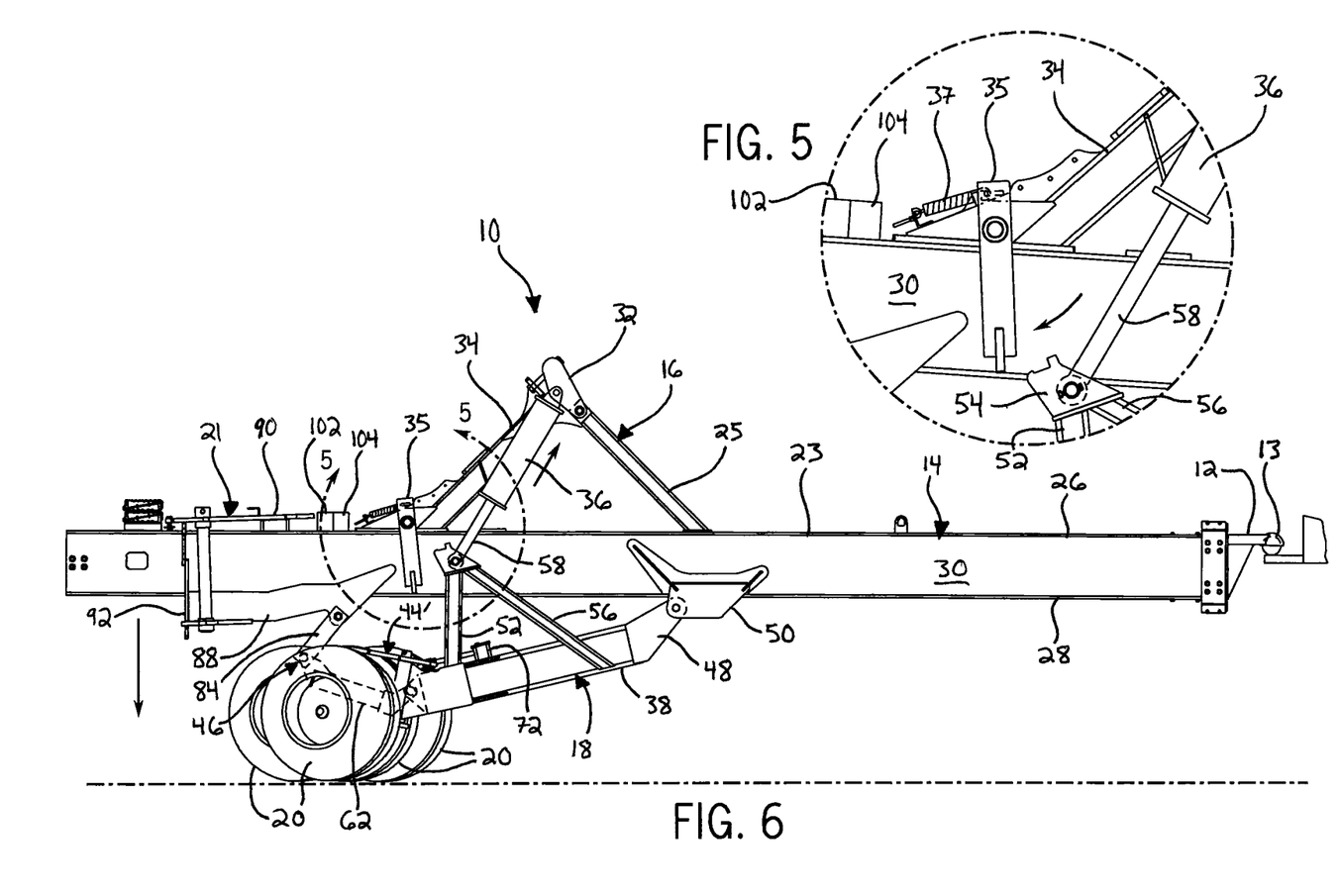
FIG. 5 is a detail view of the area defined by line 5-5 in FIG. 6.
FIG. 6 is a side view of the agricultural implement of FIG. 1 shown in a working position.

Referring to FIGS. 3 and 6, boom support member 21 includes elongated members 88 to connect to the linkage assembly 46, an upper member 90 positioned above the frame 14, and a lower member 92 to connect the elongated members 88 and the upper member 90. The upper member 90 is fixed to the upper surface 26 of the hitch boom 23. The lower member 92 is positioned below the lower surface 28 of the hitch boom 23 and is fixed to the upper member 90. The elongated members 88 are fixed to the lower member 92 and link to the second end of the second link 84. As discussed above, the boom support member 21 links the foldable wing booms 22 and 24 to the frame 14.

As shown in FIGS. 3 and 6, the agricultural implement 10 can be positioned in different positions that are appropriate for transporting the agricultural implement 10 and moving components of the agricultural implement 10 into a working position. The agricultural implement 10 moves between the transport and working positions by actuating the hydraulic cylinders 36. Referring to FIG. 6, the hitch boom 23 is positioned in a relatively low working position when the extending rods 58 of the hydraulic cylinders 36 are retracted. The working position is suitable for permitting the seed planting units or other components attached to the foldable wing booms 22 and 24 to engage the ground or enter an otherwise appropriate working position. Referring to FIG. 3, the hitch boom 23 is elevated further above the ground when the extending rods 58 of the hydraulic cylinders 36 are extended. Extending the rods 58 causes the hitch boom 23 to rotate clockwise slightly as viewed from FIG. 3. Similarly, the first link 62 of the linkage assembly 46 rotates clockwise slightly, and the elongated neck member 38 and the second link 84 rotate counter-clockwise slightly when the rods 58 are extended. The elevated position is suitable for elevating components attached to the foldable wing booms 22 and 24 above the ground and transporting the agricultural implement 10 on a surface other than a field, such as a road. In addition, the elevated position is also a position in which the foldable wing booms 22 and 24 may be folded toward the frame 14 as discussed above.

Referring to FIGS. 3-6, in some embodiments of the present invention, the cylinder rod brackets 54 engage the locking member 35 when the agricultural implement is in the elevated/transport position. In some embodiments of the present invention, the locking member 35 must be moved in a clockwise direction, as shown in FIG. 5, to permit the hydraulic cylinders 36 to retract and thereby lower the agricultural implement 10. The locking member 35 may be rotated by any suitable actuating mechanism, such as a cable that pulls the top section of the locking member 35 and extends toward the work vehicle.

In some embodiments of the present invention, the locking member 35 engages the cylinder rod brackets 54 in a manner such that part of the weight of the agricultural implement 10 is supported through the locking member 35 and the cylinder rod brackets 54 during transport. Therefore, the hydraulic cylinders 36 do not solely support the weight of agricultural implement 10 in the elevated/transport position. However, the hydraulic cylinders 36 must be extended slightly to disengage the locking member 35 from the cylinder rod brackets 54 before the agricultural implement 10 is lowered.

As discussed above, maneuvering of a agricultural implement can be difficult when the distance between a work vehicle and the steering wheels of the implement is large. The steering assembly 42 is provided to assist in turning the agricultural implement 10. Actuation of the hydraulic steering cylinder 64 results in substantially similar motion of the wheel pivot assemblies 44 and 44'. Therefore, only motion of the wheel pivot assembly 44 will be described here in detail. Referring to FIG. 7, retracting the rod 74 of the hydraulic steering cylinder 64 causes the first elongated link 68 to move such that the wheel pivot assembly 44 rotates in a clockwise direction (as viewed from above the agricultural implement 10). Rotation of the wheel pivot assembly 44 in a clockwise direction leads to a left turn if the agricultural implement is traveling forward. Referring to FIG. 8, extending the rod 74 of the hydraulic steering cylinder 64 causes the first elongated link 68 to move such that the wheel pivot assembly 44 rotates in a counter-clockwise direction. Rotation of the wheel pivot assembly 44 in a counter-clockwise direction leads to a right turn if the agricultural implement 10 is traveling forward. Operation of the steering assembly 42 advantageously reduces the turning radius of the agricultural implement 10. Therefore, the agricultural implement 10 can be maneuvered through narrow areas.

Those skilled in the art will recognize that additional components are needed in conjunction with the hydraulic cylinders 36 and the hydraulic steering cylinder 64, such as a pump (not shown) and additional hydraulic conduits (not shown). Any appropriate pump and conduits may be used, provided the pump meets the output requirements to lift and turn the appropriate components of the agricultural implement 10. In addition, in at least some embodiments, the hydraulic components are provided such that the hydraulic cylinders 36 may be actuated independently of the hydraulic steering cylinder 64.

As described briefly above, the agricultural implement 10 includes a positioning system 100 that controls steering of the agricultural implement 10. In at least some embodiments, the positioning system 100 controls steering so that the agricultural implement 10 automatically follows the path of the work vehicle 96. In addition, in at least some embodiments, the positioning system 100 controls steering so that the agricultural implement 10 does not become skewed relative to the work vehicle 96 while traveling along the side of a hill. These and other applications of the positioning system 100 are described in further detail below.

In general, the positioning system 100 includes an implement receiver 102 for receiving a positioning signal from a positioning source (not shown) and a controller 104 that operatively connects to the implement receiver 102 and controls the hydraulic steering cylinder 64 to steer the wheel pivot assemblies 44 and 44'. In some embodiments, the positioning system 100 includes a vehicle receiver 106 positioned within the work vehicle 96 for receiving the positioning signal from the positioning source. These and other aspects of the positioning system 100 are described in the following paragraphs.

Figure 9:
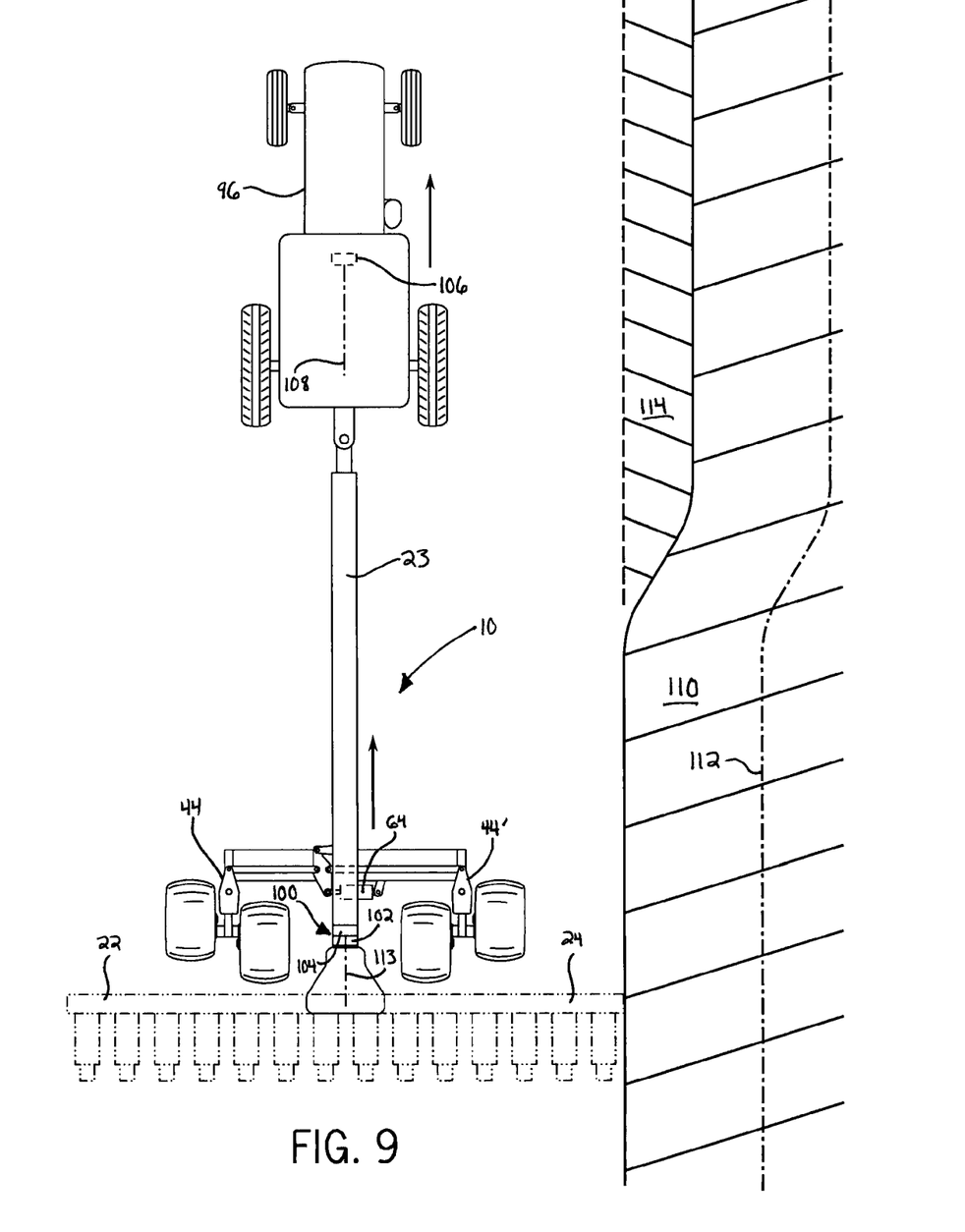
FIG. 9 is a schematic top view of the agricultural implement of FIG. 1 being towed by a work vehicle (some components of the agricultural implement are hidden for simplicity)

Referring to FIGS. 1 and 9, the implement receiver 102, in at least some embodiments, is a GPS receiver for receiving a positioning signal from a GPS source, for example, a set of satellites or a set of towers. As those skilled in the art will appreciate, the implement receiver 102 uses the positioning signal to determine the current position of the agricultural implement 10, and specifically the current position of the implement receiver 102. Those skilled in the art will also appreciate that the implement receiver 102 also uses data regarding the position of the positioning source and the time required to receive the positioning signal to determine the current position of the agricultural implement 10. The construction of the implement receiver 102 is well known in the art, and the implement receiver 102 may be positioned on the hitch boom 23 near the wheel pivot assemblies 44 and 44' as shown in FIG. 1. The implement receiver 102 sends a receiver signal derived from the current position of the agricultural implement 10 to the controller 104.

Still referring to FIGS. 1 and 9, the controller 104, in at least some embodiments, is a programmable logic controller (PLC). The construction of the controller 104 is well known in the art, and the controller 104 may be positioned on the hitch boom 23 near the implement receiver 102 as shown in FIG. 1. The controller 104 receives the receiver signal and sends a control signal derived from the receiver signal to control the hydraulic steering cylinder 64. As a result, the positioning system 10 is capable of controlling the wheel pivot assemblies 44 and 44' based on the current position of the agricultural implement 10.

Referring to FIG. 9, in some embodiments, the work vehicle 96 includes a vehicle receiver 106 such as a GPS receiver for receiving the positioning signal from the GPS source. As those skilled in the art will appreciate, the vehicle receiver 106 uses the vehicle positioning signal alone or in combination with other parameters of the work vehicle 96 (e.g., past and current speed and direction of the work vehicle 96) to determine the current position of the work vehicle 96, and specifically the current position of the vehicle receiver 106. The construction of the vehicle receiver 106 is well known in the art, and the vehicle receiver 106 may be positioned near the front of the cab of the work vehicle 96 as shown in FIG. 9. The vehicle receiver 106 sends a vehicle receiver signal derived from the current position of the work vehicle 96 to the controller 104. As described briefly above, in some embodiments the positioning system 100 controls steering so that the agricultural implement 10 automatically follows the path of the work vehicle 96. Specifically, the controller 104 controls the hydraulic steering cylinder 64 so that the implement receiver 102 follows a path 108 of the vehicle receiver 106 as shown in FIG. 9.

Figure 10:
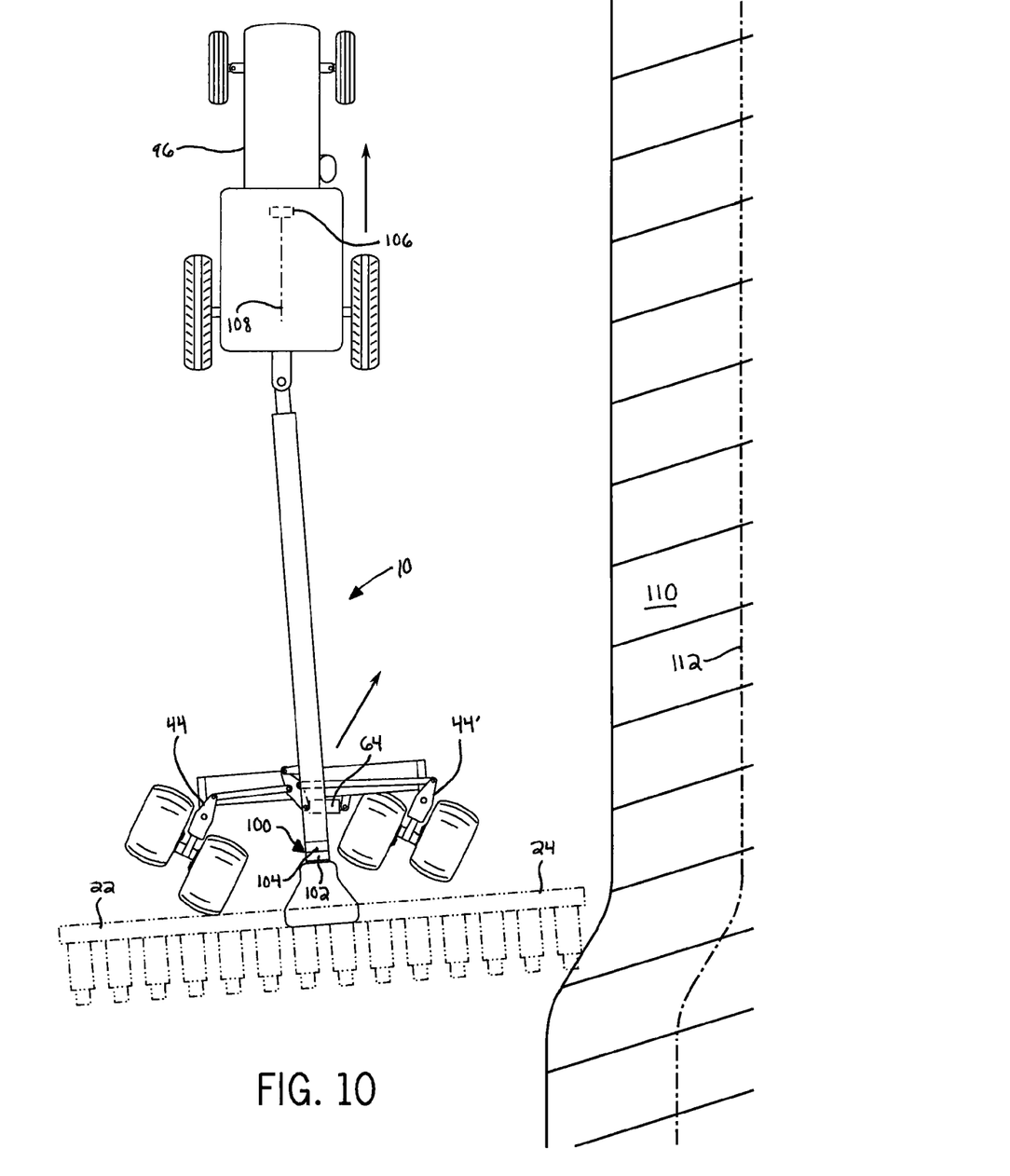
FIG. 10 is a schematic top view of the agricultural implement of FIG. 1 turning to cover a potential non-covered area (some components of the agricultural implement are hidden for simplicity)
Figure 11:
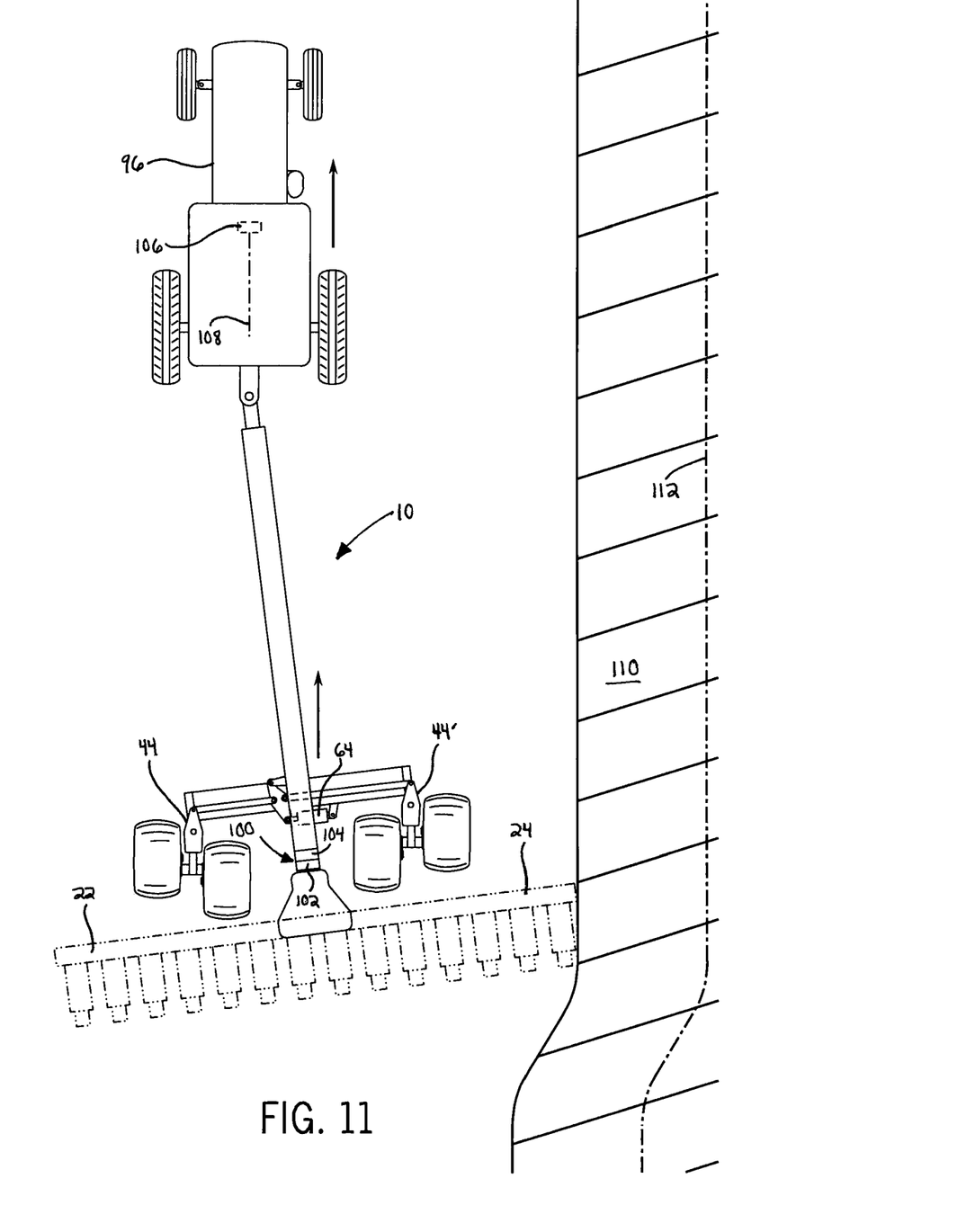
FIG. 11 is a schematic top view of the agricultural implement of FIG. 1 covering a potential non-covered area (some components of the agricultural implement are hidden for simplicity)
Figure 12:
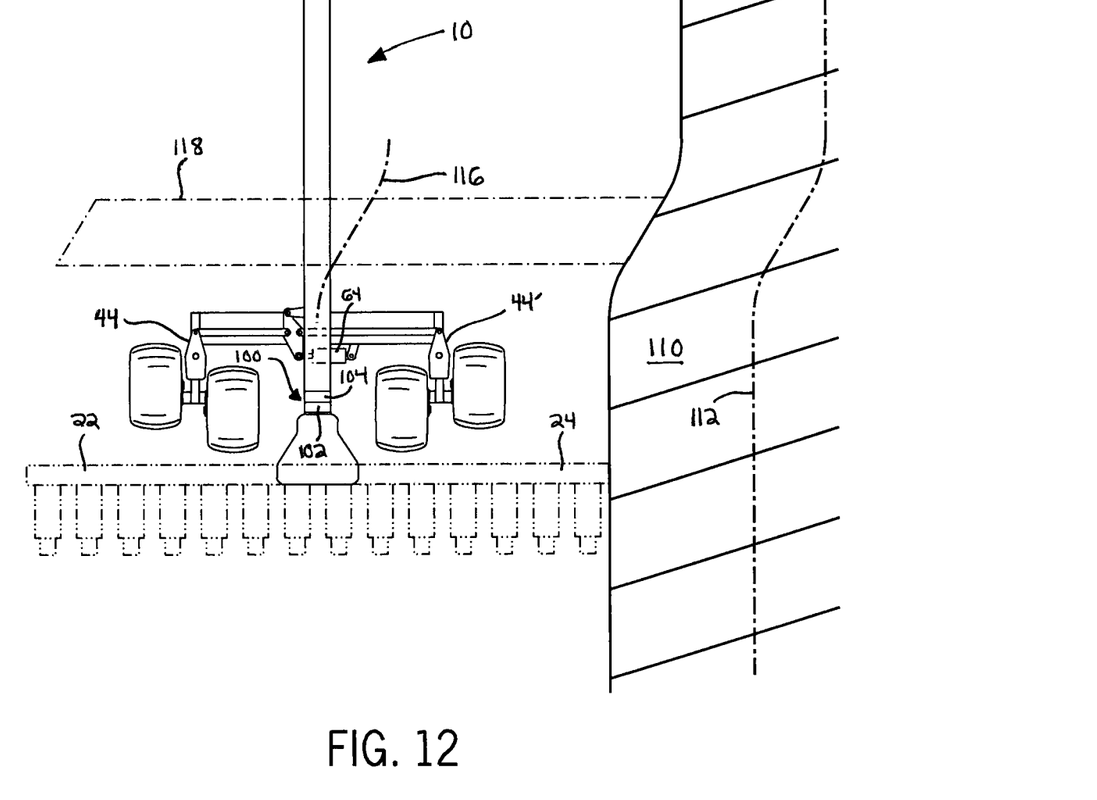
FIG. 12 is a schematic top view of the agricultural implement of FIG. 1 illustrating a potential travel path and a potential coverage area of the implement (some components of the agricultural implement are hidden for simplicity).

In some embodiments, in addition to or as an alternative to following the path 108 of the vehicle receiver 106, the positioning system 100 steers the wheel pivot assemblies 44 and 44' to ensure the tools of the foldable wing booms 22 and 24 engage all areas of a field. Specifically, the controller 104 determines and stores a previous coverage area 110 based on the dimensions of the agricultural implement 10 and a path 112 followed by the agricultural implement 10 on a previous pass as shown in FIG. 9. Subsequently, the controller 104 determines if the previous coverage area 110 and a current implement travel path 113 will result in a non-covered area 114. Referring to FIGS. 10 and 11, the controller 104 reorients the wheel pivot assemblies 44 and 44' so that the agricultural implement 10 substantially minimizes the creation of a non-covered area if a potential non-covered area 114 is detected. Referring to FIG. 12, in some embodiments, in order to determine the proper orientation of the wheel pivot assemblies 44 and 44' to cover the potential non-covered area 114, the controller 104 determines a potential implement travel path 116 from potential incremental orientation changes of the wheel pivot assemblies 44 and 44'. Similarly, in some embodiments, the controller 104 determines a potential coverage area 118 from potential incremental orientation changes of the wheel pivot assemblies 44 and 44'. Further still, in some embodiments, the controller 104 determines the potential implement travel path 116 and the potential coverage area 118 by using a sequence of incremental orientation changes of the wheel pivot assemblies 44 and 44' that occur at different instants as the implement 10 moves.

The positioning system 100 of the agricultural implement 10 is particularly advantageous in several situations. For example, and in some embodiments, the positioning system 100 advantageously prevents the agricultural implement 10 from slipping or skewing relative to the vehicle 96 as the vehicle 96 travels across a hill. That is, the positioning system 100 reorients the wheel pivot assemblies 44 and 44' to prevent the agricultural implement 10 from moving from a straight travel path orientation. The straight travel path orientation may be, for example, an orientation of the agricultural implement 10 in which the implement receiver 102 follows the path 108 of the vehicle receiver 106.

As another example, and in some embodiments, positioning systems 10 are used with both a tilling implement and a planting implement to perform effective strip-till and subsequent planting operations. Specifically, the controller 104 of the tilling implement determines and stores the location of the rows based on the positioning signal as the tilling implement moves. Thereafter, data indicating the location of the rows is transferred to the controller 104 of the planting implement so that the planting units 27 can be automatically positioned relative to the rows as the planting implement moves. The data may be transferred between controllers 104 by any appropriate means, such as a removable disk, wireless connection, or the like. In addition and in some embodiments, the positioning system 10 of the planting implement rotates the implement relative to the work vehicle 96 so that the work vehicle 96 does not pass over and damage the rows formed by the tilling implement.

In some embodiments, the hydraulic cylinders 36 operatively connect to the controller 106 to adjust the height of the frame above the ground in response to the control signal. For example, the hydraulic cylinders 36 may lift the frame 14 to the transport position automatically when implement receiver 102 indicates that the agricultural implement 10 has exited a field.

The positioning system 100 described above reduces the amount of effort required from an operator to perform an agricultural operation such as planting seeds in a field. In addition, the positioning system 100 may reduce fatigue to the operator because the system automatically and directly steers the implement to ensure appropriate coverage.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

To apprise the public of the scope of this invention, the following claims are made:

What is claimed is:

1. An assembly for facilitating steering of an agricultural implement linkable to a work vehicle in a field, the agricultural implement including a main frame and a connection joint for linking the main frame to the work vehicle so as to allow the agricultural implement to be towed through the field by the work vehicle along a path, the assembly comprising:
at least a first ground-engaging wheel to engage a ground surface below the frame thereby supporting the frame above the ground surface;
a positioning system for receiving positioning signals from a positioning source as the agricultural implement travels through the field, the positioning system determining current positions of the agricultural implement from the positioning signals as the agricultural implement travels in the field and a coverage area of the field based upon prior positioning signals, and the positioning system generating control signals, wherein each control signal is derived from a corresponding current position of the agricultural implement and the coverage area; and
a steering cylinder connected to the first ground-engaging wheel and operatively connected to the positioning system to steer the first ground-engaging wheel based on the control signals thereby continually adjusting the path as the agricultural implement travels through the field to minimize the creation of a non-coverage area of the field.

2. The assembly of claim 1, wherein the positioning system comprises: an implement receiver for receiving the positioning signal from the positioning source, and the implement receiver sending a receiver signal derived from the corresponding current position of the agricultural implement; and a controller operatively connected to the implement receiver for receiving the receiver signal, and the controller sending the control signal.

3. The assembly of claim 2, wherein the controller operatively connects to a vehicle receiver of the work vehicle, the vehicle receiver receiving the positioning signal from the positioning source, a corresponding current position of the work vehicle being determined from the positioning signal, and the controller receiving a vehicle receiver signal from the vehicle receiver, the vehicle receiver signal being derived from the current position of the work vehicle.

4. The assembly of claim 1, wherein the steering cylinder is a hydraulic steering cylinder including a hydraulic valve operatively connected to the positioning system to control an amount of hydraulic fluid supplied to the hydraulic steering cylinder in response to the control signal.

5. An assembly for facilitating steering of an agricultural implement linkable to a work vehicle for towing the agricultural implement through a field along a path, the agricultural implement including a main frame and a connection joint for linking the main frame to the work vehicle, the assembly comprising:

a wheel support member supported below the frame; at least a first ground-engaging wheel supported by the wheel support member to engage a ground surface below the frame thereby supporting the frame above the ground surface;

at least a first lift cylinder connected between the frame and the wheel support member and controllable to adjust the height of the frame above the ground;

an implement receiver for receiving positioning signals from a positioning source, the implement receiver determining current positions of the implement receiver from at least the positioning signals as the agricultural implement travels in the field, and the implement receiver sending receiver signals derived from the current positions of the implement receiver;

a controller operatively connected to the implement receiver for receiving the receiver signals and determining a coverage area of the field based upon prior receiver signals, and the controller generating a control signals derived from the receiver signals and the coverage area; and a steering cylinder connected to the wheel support member and operatively connected to the controller to steer the first ground-engaging wheel based on the control signals thereby continually adjusting the path as the agricultural implement travels through the field to minimize the creation of a non-coverage area of the field.

6. The assembly of claim 5, wherein the first lift cylinder is operatively connected to the controller to adjust the height of the frame above the ground in response to the control signals.

7. The assembly of claim 5, further comprising a second lift cylinder connected between the frame and the wheel support member on a side of the frame opposite the first lift cylinder, and the second lift cylinder controllable to adjust the height of the frame above the ground.

8. The assembly of claim 5, further comprising at least a second ground-engaging wheel supported by the wheel support member and engaging the ground surface below the frame thereby supporting the frame above the ground surface, the steering cylinder connected to the second-ground engaging wheel to control steering of the second ground-engaging wheel based on the control signal and independently of the first lift cylinder.

9. The assembly of claim 5, wherein the steering cylinder and the first lift cylinder are hydraulic cylinders, each of the steering cylinder and the first lift cylinder including a hydraulic valve operatively connected to the controller to control an amount of hydraulic fluid supplied to the hydraulic cylinder based on the control signals.

* * * * *